United States Patent
Bossman et al.

(10) Patent No.: US 10,380,104 B2
(45) Date of Patent: Aug. 13, 2019

(54) METHOD TO MONITOR DYNAMIC SQL STATEMENTS FOR AUTOMATIC STABILIZATION IN A DATA SHARING ENVIRONMENT

(71) Applicant: International Business Machines Corporation, Armonk, NY (US)

(72) Inventors: Patrick D. Bossman, Sarasota, FL (US); Frank D. Bower, San Jose, CA (US); Tammie Dang, Morgan Hill, CA (US); Peter Kuang, San Jose, CA (US); Euna Park, Santa Clara, CA (US); Maryela E. Weihrauch, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 15/231,838

(22) Filed: Aug. 9, 2016

(65) Prior Publication Data

US 2018/0046677 A1 Feb. 15, 2018

(51) Int. Cl.
*G06F 16/242* (2019.01)
*G06F 16/2452* (2019.01)

(52) U.S. Cl.
CPC ...... *G06F 16/2423* (2019.01); *G06F 16/2435* (2019.01); *G06F 16/24526* (2019.01)

(58) Field of Classification Search
CPC ......... G06F 17/30306; G06F 17/30982; G06F 17/30424; G06F 17/30457; G06F 16/242; G06F 16/2423
See application file for complete search history.

(56) References Cited

U.S. PATENT DOCUMENTS

| | | | |
|---|---|---|---|
| 6,321,235 B1 | 11/2001 | Bird | |
| 6,353,833 B1 | 3/2002 | Bird et al. | |
| 6,539,371 B1 * | 3/2003 | Bleizeffer | ......... G06F 17/30306 |
| 7,644,063 B2 | 1/2010 | Bossman et al. | |
| 8,060,495 B2 | 11/2011 | Beavin et al. | |

(Continued)

OTHER PUBLICATIONS

IBM, "A method and system to monitor and record the SQL statements sent to a relational database by a Java application", IPCOM000188516D, IP.com, Oct. 2009.

(Continued)

*Primary Examiner* — Etienne P Leroux
(74) *Attorney, Agent, or Firm* — North Shore Patents, P.C.; Michele Liu Baillie

(57) ABSTRACT

A database system searches for any statements that satisfy one or more of a set of filtering criteria. When a given dynamic query statement fully satisfies the set of filtering criteria, the given statement is stabilized by persistently storing a bound form of the given dynamic query statement. When the given dynamic query statement partly satisfies the set of filtering criteria, a monitoring request is created with the set of filtering criteria to begin monitoring subsequent executions of the statement, and the statement is linked to the monitoring request. When the given dynamic query statement subsequently fully satisfies the set of filtering criteria, the statement is stabilized by persistently storing the bound form of the statement. When the given dynamic query is re-executed, the stabilized statement is loaded, and the PREPARE process is bypassed.

17 Claims, 3 Drawing Sheets

(56) References Cited

U.S. PATENT DOCUMENTS

| | | |
|---|---|---|
| 8,805,852 B2 | 8/2014 | Gopal et al. |
| 8,825,616 B2 | 9/2014 | Huffman et al. |
| 8,832,143 B2 | 9/2014 | Benadjaoud et al. |
| 8,892,544 B2 | 11/2014 | Pendap et al. |
| 9,043,310 B2 | 5/2015 | Liu et al. |
| 9,189,522 B2 | 11/2015 | Das et al. |
| 2001/0053957 A1* | 12/2001 | Blair ................. G06F 17/30982 702/19 |
| 2004/0059719 A1* | 3/2004 | Gupta ............... G06F 17/30457 |
| 2013/0159321 A1* | 6/2013 | Bossman .......... G06F 17/30424 707/748 |
| 2014/0277600 A1 | 9/2014 | Kolinsky et al. |
| 2015/0088913 A1 | 3/2015 | Feng et al. |

OTHER PUBLICATIONS

Ziauddin, Mohamed et al., "Optimzer Plan Change Management: Improved Stability and Performance in Oracle 11g", Proceedings of the VLDB Endowment, New Zealand, Aug. 2008.

* cited by examiner

METHOD TO MONITOR DYNAMIC SQL STATEMENTS FOR AUTOMATIC STABILIZATION IN A DATA SHARING ENVIRONMENT

BACKGROUND

Dynamic SQL statements allows one to build Structured Query Language (SQL) statements dynamically at runtime. Unlike static SQL statements, the full text of the dynamic SQL statement is not known at the application's bind time. In an ad hoc query environment, performance of dynamic SQL statements is an important priority. To optimize dynamic SQL statement's performance, the prepared or bound form of the SQL statement is often saved in the in-memory global dynamic statement cache. Then, for the next request to prepare the dynamic SQL statement for execution, a copy of the bound form of the SQL statement from the cache may be used. However, the storage of the bound form of the dynamic SQL statement in the in-memory cache is not persistent and only provide stabilization for dynamic queries over an instance of a database system. Further, stabilization is not realized across different version of the database system. Once the bound form of the SQL statement is deleted from the cache, the dynamic SQL statement must be prepared again. Even when the access plan for the dynamic SQL statement is persistently stored and reused, there is no guarantee that the same bound form will result when the prepare process is repeated using the stored access plan.

SUMMARY

Disclosed herein is a method for monitoring dynamic query statements for automatic stabilization and a computer program product as specified in the independent claims. Embodiments of the present invention are given in the dependent claims. Embodiments of the present invention can be freely combined with each other if they are not mutually exclusive.

According to an embodiment of the present invention, in a method for monitoring dynamic query statements in a database system, a database system searches for any dynamic query statements that satisfy one or more of a set of filtering criteria. When a given dynamic query statement fully satisfies the set of filtering criteria, the given dynamic query statement is stabilized by persistently storing a bound form of the given dynamic query statement. When the given dynamic query statement partly satisfies the set of filtering criteria, a monitoring request is created with the set of filtering criteria to begin monitoring subsequent executions of the given dynamic query statement, and the given dynamic query statement is linked to the monitoring request. When the given dynamic query statement subsequently fully satisfies the set of filtering criteria, stabilizing the given dynamic query statement by persistently storing the bound form of the given dynamic query statement. When the given dynamic query is re-executed, the stabilized statement is loaded and the PREPARE process is bypassed.

DETAILED DESCRIPTION

Embodiments of the present invention monitor dynamic query statements as they are executed in a database system for automatic stabilization. Stabilization involves storing the bound forms of the dynamic query statements, with access path information and its corresponding object and authorization dependency information in the database system, into a persistent repository, such as a catalog table. The bound form contains the compiled runtime structures of the dynamic query statement, including the binding of program variables to the parameter placeholders or marks in the statement. Then, when the same dynamic query statement is re-executed, and the bound form of the statement does not exist in an in-memory dynamic statement cache, the same bound form of the statement stored in the persistent repository can be reused, which would result in the same behavior and response time.

Figure 1:
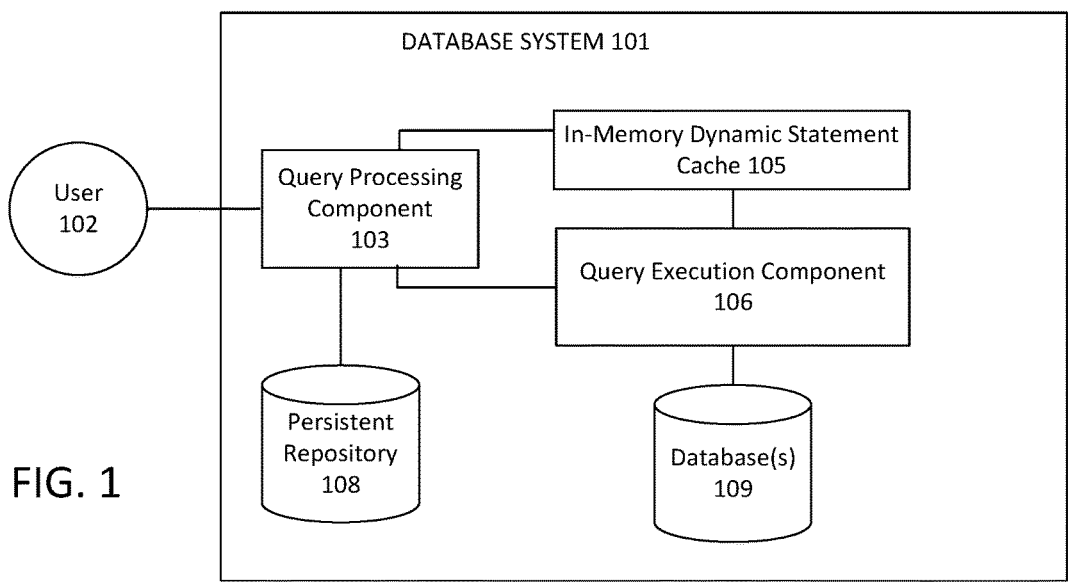
FIG. 1 illustrates a database system in which the execution of dynamic query statements are monitored according to embodiments of the present invention.

FIG. 1 illustrates a database system in which the execution of dynamic query statements are monitored according to embodiments of the present invention. The database system 101 is implemented by one or more specifically programmed computer system, illustrated in FIG. 4 (described further below). The database system 101 includes a query processing component 103, an in-memory dynamic statement cache 105 ("cache"), and a query execution component 106. The database system 101 includes or has access to a persistent repository 108 and one or more databases 109. The query processing component 103 receives dynamic query statements from a user 102 and prepares the dynamic query statements for execution. The query processing component 103 further monitors the execution of dynamic query statements in the database system 101. The cache 105 non-persistently stores bound forms of dynamic query statements, and the query execution component 106 executes the dynamic query statements using the bound forms. The persistent repository 108 persistently stores bound forms of dynamic query statements, across different instances of the database system 101, and the database(s) 109 store data on which the statements are executed. The illustrated components of the database system 101 further function as described below.

The cache 105 further stores dependency information used to prepare the dynamic query statements, such as table, view, routine, sequence, authorization identities, etc. Also stored in the cache 105 are execution statistics of each cached dynamic query statement, such as number of executions, central processing unit (CPU) consumption time, elapsed time, suspend time and other consumed resources. The execution statistics are updated on subsequent executions of the dynamic query statements in the cache 105. The database system 101 further stores in the cache 105 attributes which were used to prepare the dynamic query statements, such as the object's schema, special registers (e.g. routine paths, locale, rounding mode), and client information for queries that originated from a remote client system.

Figure 2:
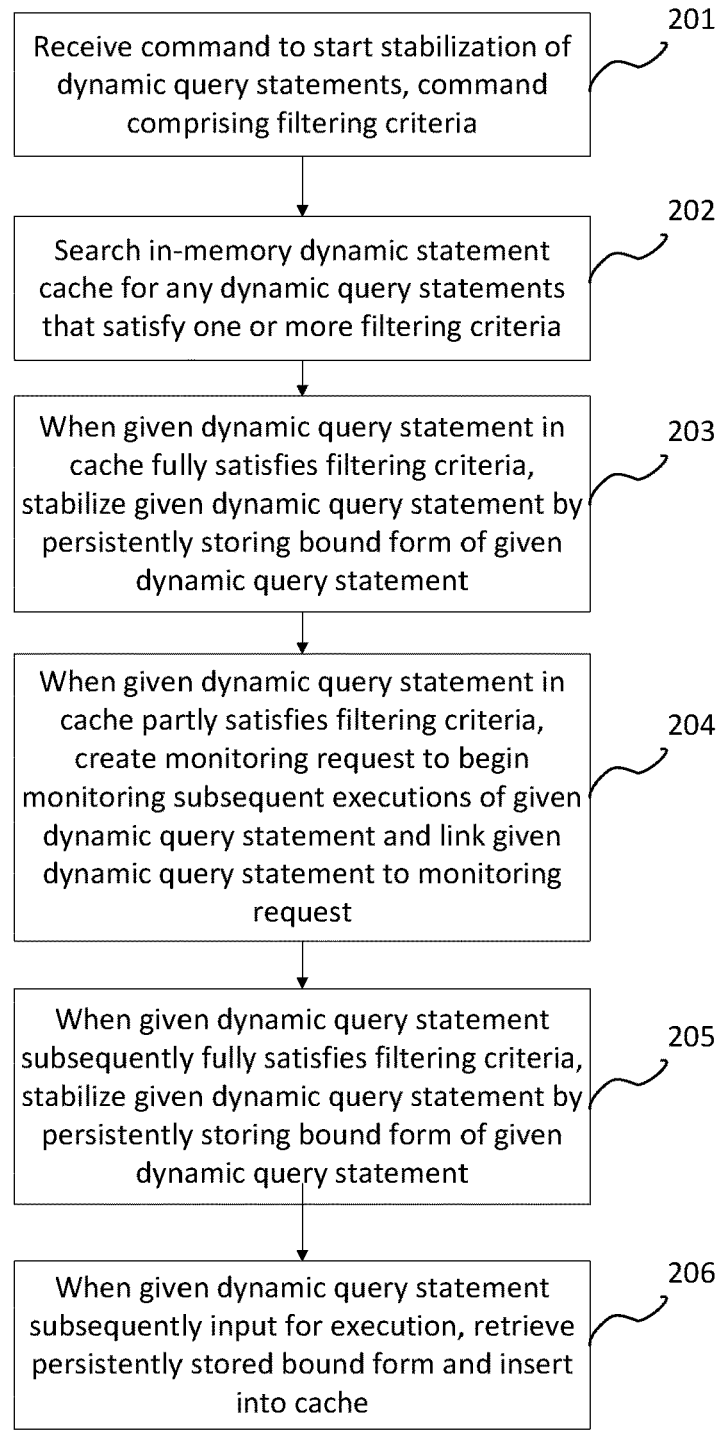
FIG. 2 illustrates a method for monitoring dynamic query statements in a database system according to embodiments of the present invention.

FIG. 2 illustrates a method for monitoring dynamic query statements in a database system according to embodiments of the present invention. The query processing component 103 receives a command to start stabilization of dynamic query statements in the database system 101, where the command comprises a set of filtering criteria (201). Any combination of the dependency information, execution statistics, and attributes stored in the cache 105 may be used as a filtering criteria. In response to the command, the query processing component 103 searches the cache 105 for any dynamic query statements that satisfy one or more of the filtering criteria (202). When a given dynamic query statement in the cache 105 fully satisfies the filtering criteria, i.e., satisfies each of the set of filtering criteria, the query processing component 103 stabilizes the given dynamic query statement by persistently storing the bound form of the given dynamic query statement (203). When a given dynamic query statement in the cache 105 partly satisfies the filtering criteria, i.e., satisfies at least one of the set of filtering criteria but not all of the set of the filtering criteria, the query processing component 103 does not stabilize the given dynamic query statement. Instead, the query processing component 103 creates a monitoring request, comprising the set of filtering criteria, to begin the monitoring of subsequent executions of the given dynamic query statement and links the given dynamic query statement to the monitoring request (204). When the query processing component 103 determines that the given dynamic query statement subsequently fully satisfies the filtering criteria, the query processing component 103 stabilizes the given dynamic query statement by persistently storing the bound form of the given dynamic query statement (205). In this illustrative embodiment, stabilization involves the storing of the compiled runtime structures of the given dynamic query statement in the persistent repository 108. When the given dynamic query statement is subsequently input for execution, the persistently stored bound form of the given dynamic query statement is retrieved and inserted into the cache 105 (206), bypassing the prepare process. The dynamic query statement is then executed using the bound form inserted into the cache 105.

Figure 3:
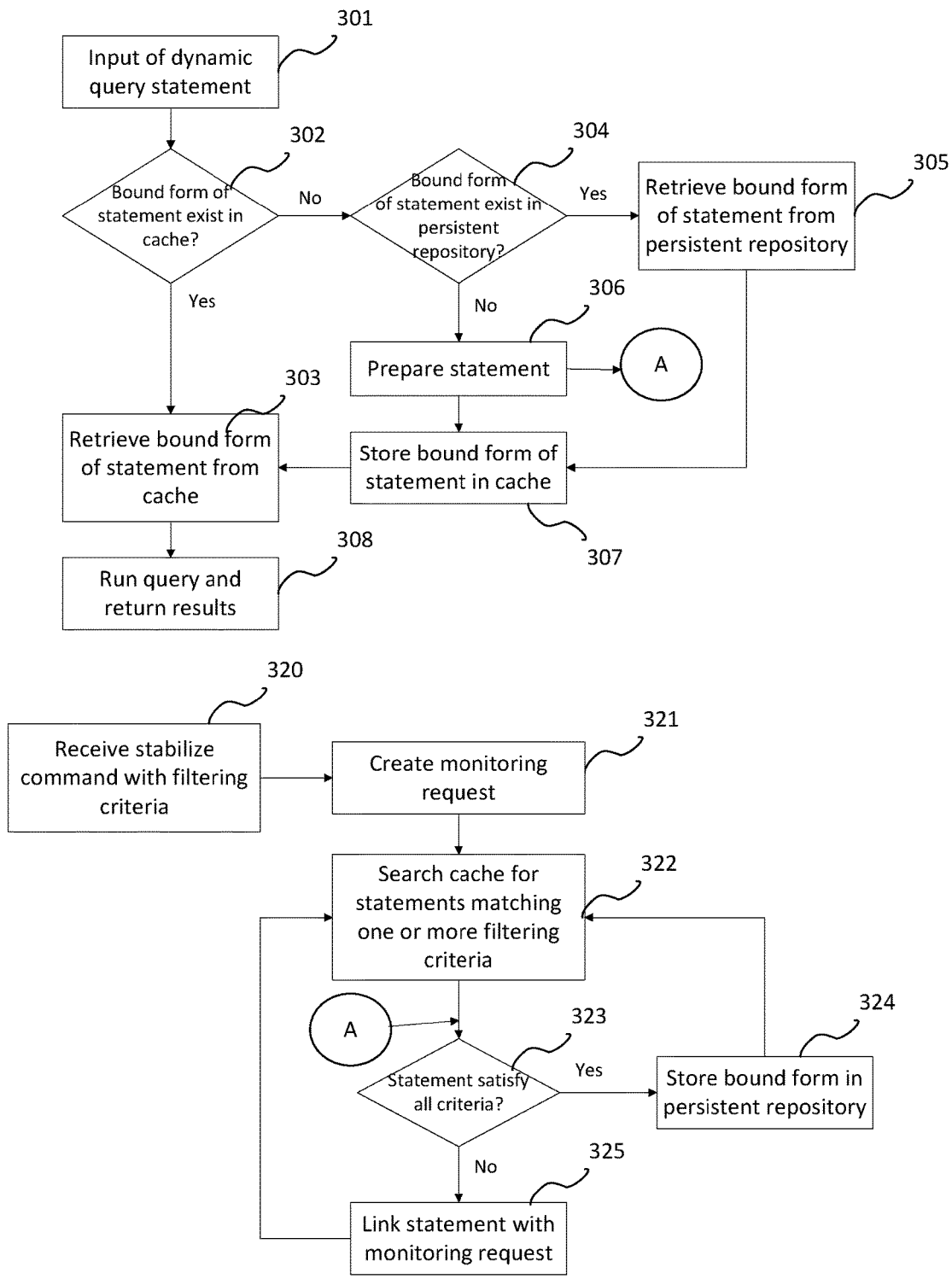
FIG. 3 illustrates in more detail a method for monitoring dynamic query statement in a database system according to embodiments of the present invention.

FIG. 3 illustrates in more detail a method for monitoring dynamic query statement in a database system according to embodiments of the present invention. When a dynamic query statement is input (301), the query processing component 103 searches the cache 105 to determine whether a bound form of the statement exists in the cache 105 (302). When the bound form of the dynamic query statement exists in the cache 105, the query execution component 106 retrieves the bound form of the dynamic query statement from the cache 105 (303), runs the query using the bound form, and returns the results (308). When the bound form of the dynamic query statement does not exist in the cache 105, i.e., a cache miss, the query processing component 103 searches the persistent repository 108 to determine whether the bound form of the dynamic query statement exists in the persistent repository 108 (304). When the bound form of the dynamic query statement also does not exists in the persistent repository 108, the query processing component 103 prepares the statement (306), including creating the bound form of the statement, and stores the bound form in the cache 105 (307). The query execution component 106 retrieves the bound form of the dynamic query statement from the cache 105 (303), runs the query using the bound form, and returns the results (308). When the bound form of the dynamic query statement does not exist in the cache 105 but exists in the persistent repository 108 (304), the query processing component 103 retrieves the bound form of the dynamic query statement from the persistent repository 108 (305) and stores the bound form of the dynamic query statement in the cache 105 (307). The query execution component 106 retrieves the bound form from the cache 105 (303), runs the query using the bound form, and returns the results (308).

At any point in time, the database system 101 may receive a stabilize command with a set of filtering criteria to initiate the monitoring process (320). In response to the command, the query processing component 103 creates a monitoring request (321) and searches the cache 105 for dynamic query statements matching one or more of the set of filtering criteria (322). For each dynamic query statement found, when the dynamic query statement satisfies all of the set of filtering criteria (323), the bound form of the dynamic query statement is stored in the persistent repository (324). When the dynamic query statement does not satisfy all of the set of filtering criteria, the query processing component 103 does not persistently store the found form and links the dynamic query statement with the monitoring request, if a link doesn't already exist (325). Based on the monitoring request, the query processing component 103 continuously searches the cache 105 for new and existing dynamic query statements that match one or more of the set of filtering criteria in the stabilize command (322), and the remainder of the process (323-325) are repeated. When a new dynamic query statement is input and prepared for execution (306), the query processing component 103 may also check the dynamic query statement against existing monitoring requests by performing the monitoring process (322-325). With continuous monitoring, statements executed subsequent to the issuance of the monitoring request are stabilized as they satisfy all of the set of filtering criteria. The query processing component 03 may manage multiple stabilize commands simultaneously, with newly inputted statements being checked against these plurality of monitoring requests.

In the illustrated embodiments, instead of storing the precompiled access path selected for the dynamic query statement, the present invention stores the compiled runtime structures or bound form of the dynamic query statement. The bound form stored in the persistent repository 108 can be retrieved and inserted into the cache 105, bypassing the prepare process. This avoids the cost of re-compiling the access path to recreate the bound form of the dynamic query statement.

For example, assume that there exists two applications, Application A and Application B, with the following dynamic SQL statements:
Application A: SELECT * FROM SCHEMA1.T1 and
  INSERT INTO SCHEMA1.T1 SELECT FROM SCHEMA2.T2
Application B: UPDATE SCHEMA2.T2 SET C1 −1 WHERE C2='ABC' and
  DELETE FROM SCHEMA2.T2 WHERE C2='ABC'
Assume also that Applications A and B are executed in the database system 101 twice, and the bound forms of the above statements are inserted into the cache 105. Each of the above statements thus has a number of executions of 2.
Assume further that the following first stabilize command is issued to start the stabilization for dynamic query statement with monitoring capability (320):
START DYNQUERYCAPTURE GROUP (GRPA) SCHEMA(SCHEMA1) THRESHOLD (2)
MONITOR (YES)
The first stabilize command includes two example filtering criteria, schema name 'SCHEMA1' and an execution threshold of 2. In response to this first stabilize command, the query processing component 103 creates a first monitoring request for schema SCHEMA1 and execution threshold 2

(321), searches the cache 105 (322) and finds that the SELECT and INSERT statements both satisfy all of the set of filtering criteria from Application A because they reference objects with schema name 'SCHEMA1' and have reached execution threshold of 2 (323). The query processing component 103 stabilizes or stores the bound forms of the SELECT and INSERT statements in the persistent repository 108 (324).

The following database command may then be issued to display pending monitoring requests:
DISPLAY DYNQUERYCAPTURE CNO(*)
In response, the database system 101 outputs the following example messages, showing that two statements have been stabilized based on the monitoring request:

```
*** BEGIN DISPLAY DYNAMIC QUERY CAPTURE CNO (*)
    CNO         : 1
    STBLGRP     : GRPA
    SCHEMA      : SCHEMA1
    THRESHOLD   : 2
    STABILIZED  : 2
*** END DISPLAY DYNAMIC QUERY CAPTURE
```

Assume that the following second stabilize command is also issued to start stabilization with monitoring capability (320):
START DYNQUERYCAPTURE GROUP(GRPB) SCHEMA(SCHEMA2) THRESHOLD(10)
MONITOR (YES)
The query processing component 103 creates a second monitoring request schema SCHEMA2 and execution threshold of 10 as filtering criteria (321), searches the cache 105 (322), finds that the UPDATE and DELETE statements from Application B satisfy the schema criteria but do not satisfy the threshold criteria (323). The query processing component 103 does not stabilize either statement. The query processing component 103 links the two statements to the second monitoring request (325).

The following database command may then be issued to display pending monitoring requests:
DISPLAY DYNQUERYCAPTURE CNO(*)
In response, the database system 101 outputs the following example output messages, showing that two statements have been stabilized based on the first monitoring request and none have yet been stabilized based on the second monitoring request:

```
*** BEGIN DISPLAY DYNAMIC QUERY CAPTURE CNO (*)
    CNO         : 1
    STBLGRP     : GRPA
    SCHEMA      : SCHEMA1
    THRESHOLD   : 2
    STABILIZED  : 2
    CNO         : 2
    STBLGRP     : GRPB
    SQLID       : SCHEMA2
    THRESHOLD   : 10
    STABILIZED  : 0
*** END DISPLAY DYNAMIC QUERY CAPTURE
```

Assume that Application B is running again and its UPDATE statement is executed 8 more times. When searching the cache 105 (322), the query processing component 103 finds that the UPDATE statement fully satisfies the filtering criteria of the second monitoring request since the number of executions is now 10 (323). The query processing component 103 then stores the bound form of the UPDATE statement in the persistent repository 108 (324).

The following database command may then be issued to display pending monitoring requests:
DIS DYNQUERYCAPTURE CNO(*)
In response, the database system 101 outputs the following example messages, showing that two statements have been stabilized based on the first monitoring request, and one statement has been stabilized based on the second monitoring request:

```
*** BEGIN DISPLAY DYNAMIC QUERY CAPTURE CNO (*)
    CNO         : 1
    STARTMMID   : 1
    STBLGRP     : GRPA
    SCHEMA      : SCHEMA1
    THRESHOLD   : 2
    STABILIZED  : 2
    CNO         : 2
    STARTMMID   : 1
    STBLGRP     : GRPB
    SQLID       : SCHEMA2
    THRESHOLD   : 10
    STABILIZED  : 1
*** END
```

To stop a pending monitoring request, a STOP DYNQUERYCAPTURE command may be issued. For example, assume that a STOP DYNQUERYCAPTURE command is issued for the second monitoring command. In response, the monitoring request for SCHEMA2 is deleted and the link from Application B's DELETE statement is also broken. The DELETE statement can be subsequently executed but it will not be stabilized.

Assume further that a new Application C executes the following dynamic SQL statement twice:
INSERT INTO SCHEMA1.T1 SELECT * FROM SCHEMA1.T2.
As this new statement is prepared and its bound form inserted into the cache 105 (306-307), a check is made against the monitoring requests, and a link is established with the monitoring request for which the new statement satisfies one or more of the filtering criteria (323-325). When the execution threshold of 2 is reached, the query processing component 103 will automatically stabilize this statement. The following example output displays the updated progress in the monitoring requests:

```
*** BEGIN DISPLAY DYNAMIC QUERY CAPTURE CNO (*)
    CNO         : 1
    STBLGRP     : GRPA
    SCHEMA      : SCHEMA1
    THRESHOLD   : 2
    STABILIZED  : 3
*** END DISPLAY DYNAMIC QUERY CAPTURE
```

In an illustrative embodiment, the stabilization command has an effect on all data sharing members in the same group. All members of the same group shares the same persistent repository 108. Thus, when users issue the same stabilization command on different members of the same data sharing group, the stabilization commands are serialized among the members such that only one copy of the bound form of a statement is stored in the persistent repository 108.

Further, in an illustrative embodiment, when an object referenced by a statement depends is dropped or altered, any bound form of the statement stored in the persistent repository 108, as well as the cache 105, must be invalidated in order to avoid concurrency issues.

Figure 4:
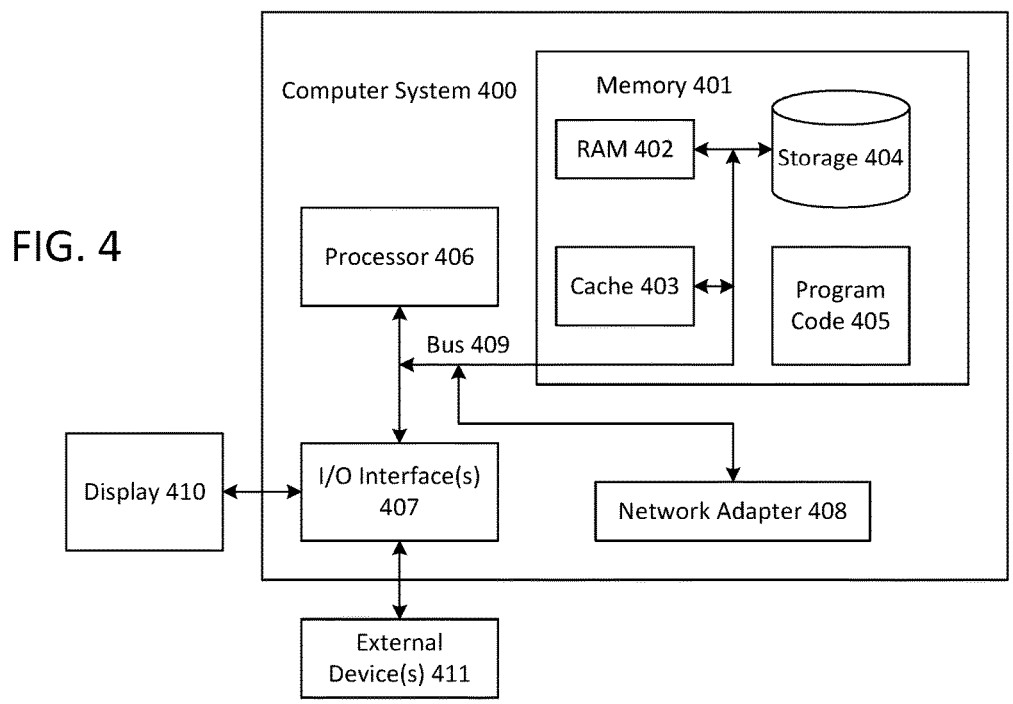
FIG. 4 illustrates a computer system according to embodiments of the present invention.

FIG. 4 illustrates a computer system according to embodiments of the present invention. The computer system 400 is operationally coupled to a processor or processing units 406, a memory 401, and a bus 409 that couples various system components, including the memory 401 to the processor 406. The bus 409 represents one or more of any of several types of bus structure, including a memory bus or memory controller, a peripheral bus, an accelerated graphics port, and a processor or local bus using any of a variety of bus architectures. The memory 401 may include computer readable media in the form of volatile memory, such as random access memory (RAM) 402 or cache memory 403, or non-volatile storage media 404. The memory 401 may include at least one program product having a set of at least one program code module 405 that are configured to carry out the functions of embodiment of the present invention when executed by the processor 406. The computer system 400 may also communicate with one or more external devices 411, such as a display 410, via I/O interfaces 407. The computer system 400 may communicate with one or more networks via network adapter 408.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for monitoring dynamic query statements in a database system, comprising:
   searching for any dynamic query statements that satisfy one or more of a set of filtering criteria;
   when a given dynamic query statement fully satisfies the set of filtering criteria:
      stabilizing the given dynamic query statement by persistently storing a bound form of the given dynamic query statement;
   when the given dynamic query statement partly satisfies the set of filtering criteria:
      creating a monitoring request comprising the set of filtering criteria to begin monitoring subsequent executions of the given dynamic query statement;
      linking the given dynamic query statement to the monitoring request; and
      when the given dynamic query statement subsequently fully satisfies the set of filtering criteria, stabilizing the given dynamic query statement by persistently storing the bound form of the given dynamic query statement; and
   when the given dynamic query statement fully satisfies the set of filtering criteria:
      receiving a subsequent input of the given dynamic query statement for execution;
      retrieving the persistently stored bound form of the given dynamic query statement; and
      inserting the bound form of the given dynamic query statement into an in-memory dynamic statement cache, wherein a PREPARE process is bypassed.

2. The method of claim 1, wherein when the given dynamic query statement partly satisfies the set of filtering, the method further comprises:
   executing a subsequent input of the given dynamic query statement;
   determining whether the given dynamic query statement satisfies all of the set of filtering criteria;
   when the given dynamic query statement satisfies all of the set of filtering criteria, stabilizing the given dynamic query statement by persistently storing the bound form of the given dynamic query statement; and
   when the given dynamic query statement does not satisfy all of the set of filtering criteria, not stabilizing the given dynamic query statement.

3. The method of claim 1, further comprising:
   receiving an input of a new dynamic query statement;
   determining that a bound form of the new dynamic query statement does not exist in an in-memory dynamic statement cache and exists in a persistent repository;
   in response, retrieving the bound form of the new dynamic query statement from the persistent repository; and
   storing the bound form of the new dynamic query statement in the in-memory dynamic statement cache.

4. The method of claim 1, further comprising:
   receiving an input of a new dynamic query statement;
   determining that a bound form of the new dynamic query statement does not exist in an in-memory dynamic statement cache and does not exist in a persistent repository;
   in response, preparing the new dynamic query statement for execution, comprising creating the bound form of the new dynamic query statement; and
   storing the bound form of the new dynamic query statement in the in-memory dynamic statement cache.

5. The method of claim 4, further comprising:
   determining that the new dynamic query statement satisfies one or more of the set of filtering criteria of the monitoring request;
   when the new dynamic query statement satisfies all of the set of filtering criteria of the monitoring request, storing the bound form of the new dynamic query statement in the persistent repository;
   when the new dynamic query statement does not satisfy all of the set of filtering criteria of the monitoring request, not storing the bound form of the new dynamic query statement in the persistent repository; and
   linking the new dynamic query statement to the monitoring request.

6. The method of claim 1, wherein an in-memory dynamic statement cache is searched for any dynamic query statements that satisfy one or more of the set of filtering criteria.

7. A computer program product for monitoring dynamic query statements in a database system, the computer program product comprising a computer readable storage medium having program instructions embodied therewith, the program instructions executable by a processor to cause the processor to:
   search for any dynamic query statements that satisfy one or more of a set of filtering criteria;
   when a given dynamic query statement fully satisfies the set of filtering criteria:
      stabilize the given dynamic query statement by persistently storing a bound form of the given dynamic query statement;
   when the given dynamic query statement partly satisfies the set of filtering criteria:
      create a monitoring request comprising the set of filtering criteria to begin monitoring subsequent executions of the given dynamic query statement;
      link the given dynamic query statement to the monitoring request; and
      when the given dynamic query statement subsequently fully satisfies the set of filtering criteria, stabilize the given dynamic query statement by persistently storing the bound form of the given dynamic query statement; and when the given dynamic query statement fully satisfies the set of filtering criteria:
receive a subsequent input of the given dynamic query statement for execution;
retrieve the persistently stored bound form of the given dynamic query statement; and
insert the bound form of the given dynamic query statement into an in-memory dynamic statement cache, wherein a PREPARE process is bypassed.

8. The computer program product of claim 7, wherein when the given dynamic query statement partly satisfies the set of filtering, the processor is further caused to:
execute a subsequent input of the given dynamic query statement;
determine whether the given dynamic query statement satisfies all of the set of filtering criteria;
when the given dynamic query statement satisfies all of the set of filtering criteria, stabilize the given dynamic query statement by persistently storing the bound form of the given dynamic query statement; and
when the given dynamic query statement does not satisfy all of the set of filtering criteria, not stabilize the given dynamic query statement.

9. The computer program product of claim 7, wherein the processor is further caused to:
receive an input of a new dynamic query statement;
determine that a bound form of the new dynamic query statement does not exist in an in-memory dynamic statement cache and exists in a persistent repository;
in response, retrieve the bound form of the new dynamic query statement from the persistent repository; and
store the bound form of the new dynamic query statement in the in-memory dynamic statement cache.

10. The computer program product of claim 7, wherein the processor is further caused to:
receive an input of a new dynamic query statement;
determine that a bound form of the new dynamic query statement does not exist in an in-memory dynamic statement cache and does not exist in a persistent repository;
in response, prepare the new dynamic query statement for execution, comprising creating the bound form of the new dynamic query statement; and
store the bound form of the new dynamic query statement in the in-memory dynamic statement cache.

11. The computer program product of claim 10, wherein the processor is further caused to:
determine that the new dynamic query statement satisfies one or more of the set of filtering criteria of the monitoring request;
when the new dynamic query statement satisfies all of the set of filtering criteria of the monitoring request, store the bound form of the new dynamic query statement in the persistent repository;
when the new dynamic query statement does not satisfy all of the set of filtering criteria of the monitoring request, not store the bound form of the new dynamic query statement in the persistent repository; and
link the new dynamic query statement to the monitoring request.

12. The computer program product of claim 7, wherein an in-memory dynamic statement cache is searched for any dynamic query statements that satisfy one or more of the set of filtering criteria.

13. A system, comprising:
a processor; and
a computer readable storage medium having program instructions embodied therewith, the program instructions executable by the processor to cause the processor to:
search for any dynamic query statements that satisfy one or more of a set of filtering criteria;
when a given dynamic query statement fully satisfies the set of filtering criteria:
stabilize the given dynamic query statement by persistently storing a bound form of the given dynamic query statement;
when the given dynamic query statement partly satisfies the set of filtering criteria:
create a monitoring request comprising the set of filtering criteria to begin monitoring subsequent executions of the given dynamic query statement;
link the given dynamic query statement to the monitoring request; and
when the given dynamic query statement subsequently fully satisfies the set of filtering criteria, stabilize the given dynamic query statement by persistently storing the bound form of the given dynamic query statement; and
when the given dynamic query statement fully satisfies the set of filtering criteria:
receive a subsequent input of the given dynamic query statement for execution;
retrieve the persistently stored bound form of the given dynamic query statement; and
insert the bound form of the given dynamic query statement into an in-memory dynamic statement cache, wherein a PREPARE process is bypassed.

14. The system of claim 13, wherein when the given dynamic query statement partly satisfies the set of filtering, the processor is further caused to:
execute a subsequent input of the given dynamic query statement;
determine whether the given dynamic query statement satisfies all of the set of filtering criteria;
when the given dynamic query statement satisfies all of the set of filtering criteria, stabilize the given dynamic query statement by persistently storing the bound form of the given dynamic query statement; and
when the given dynamic query statement does not satisfy all of the set of filtering criteria, not stabilize the given dynamic query statement.

15. The system of claim 13, wherein the processor is further caused to:
receive an input of a new dynamic query statement;
determine that a bound form of the new dynamic query statement does not exist in an in-memory dynamic statement cache and exists in a persistent repository;
in response, retrieve the bound form of the new dynamic query statement from the persistent repository; and
store the bound form of the new dynamic query statement in the in-memory dynamic statement cache.

16. The system of claim 13, wherein the processor is further caused to:
receive an input of a new dynamic query statement;
determine that a bound form of the new dynamic query statement does not exist in an in-memory dynamic statement cache and does not exist in a persistent repository;

in response, prepare the new dynamic query statement for execution, comprising creating the bound form of the new dynamic query statement; and store the bound form of the new dynamic query statement in the in-memory dynamic statement cache.

17. The system of claim 16, wherein the processor is further caused to:

determine that the new dynamic query statement satisfies one or more of the set of filtering criteria of the monitoring request;

when the new dynamic query statement satisfies all of the set of filtering criteria of the monitoring request, store the bound form of the new dynamic query statement in the persistent repository;

when the new dynamic query statement does not satisfy all of the set of filtering criteria of the monitoring request, not store the bound form of the new dynamic query statement in the persistent repository; and link the new dynamic query statement to the monitoring request.

* * * * *